United States Patent [19]
Christopher

[11] 3,991,964
[45] Nov. 16, 1976

[54] SELF-LOCKING DEVICE FOR TELESCOPIC PROPS

[75] Inventor: Stanley A. Christopher, Broadclyst, England

[73] Assignee: Evan John and Sons (Kenfig Hill) Limited, Kenfig Hill, England

[22] Filed: Dec. 10, 1974

[21] Appl. No.: 531,417

[52] U.S. Cl. .............................. 248/354 R; 403/374
[51] Int. Cl.² ................. E04G 25/00; E04G 25/08; B66F 3/08
[58] Field of Search ............ 248/412, 354 R, 354 C, 248/354 S; 403/104, 110, 374 X; 285/316

[56] References Cited
UNITED STATES PATENTS

| 581,136 | 4/1897 | Preece .......................... 248/412 X |
| 909,223 | 1/1909 | Reynolds ...................... 248/412 |
| 1,031,637 | 7/1912 | Fischer ......................... 403/104 X |
| 1,270,977 | 7/1918 | Schade .......................... 248/412 |
| 1,390,189 | 9/1921 | Bixler et al. ................. 248/354 |
| 2,838,266 | 6/1958 | Rees .............................. 403/104 X |
| 2,851,126 | 9/1958 | Ward ............................. 248/412 X |
| 2,872,223 | 2/1959 | Shearman et al. .................. 403/104 |
| 2,991,966 | 7/1961 | Varel ........................... 248/354 R X |
| 3,604,734 | 9/1971 | Friedman ...................... 403/110 X |
| 3,871,780 | 3/1975 | Svensson ............................. 403/104 |

FOREIGN PATENTS OR APPLICATIONS 661,291    4/1963    Canada .......................... 248/354 R Primary Examiner—J. Franklin Foss
Attorney, Agent, or Firm—Sughrue, Rothwell, Mion, Zinn and Macpeak

[57] ABSTRACT

A telescopic prop of the kind used for supporting formwork and scaffolding in building construction has a self-locking device which enables the prop to be locked at any desired extension without the use of the customary locking pins. The self-locking is effected through the action of a number of balls housed in an annular channel of downwardly tapering width, the balls jamming against the surface of the inner extension member of the prop, which may be a length of standard scaffolding tube.

11 Claims, 6 Drawing Figures

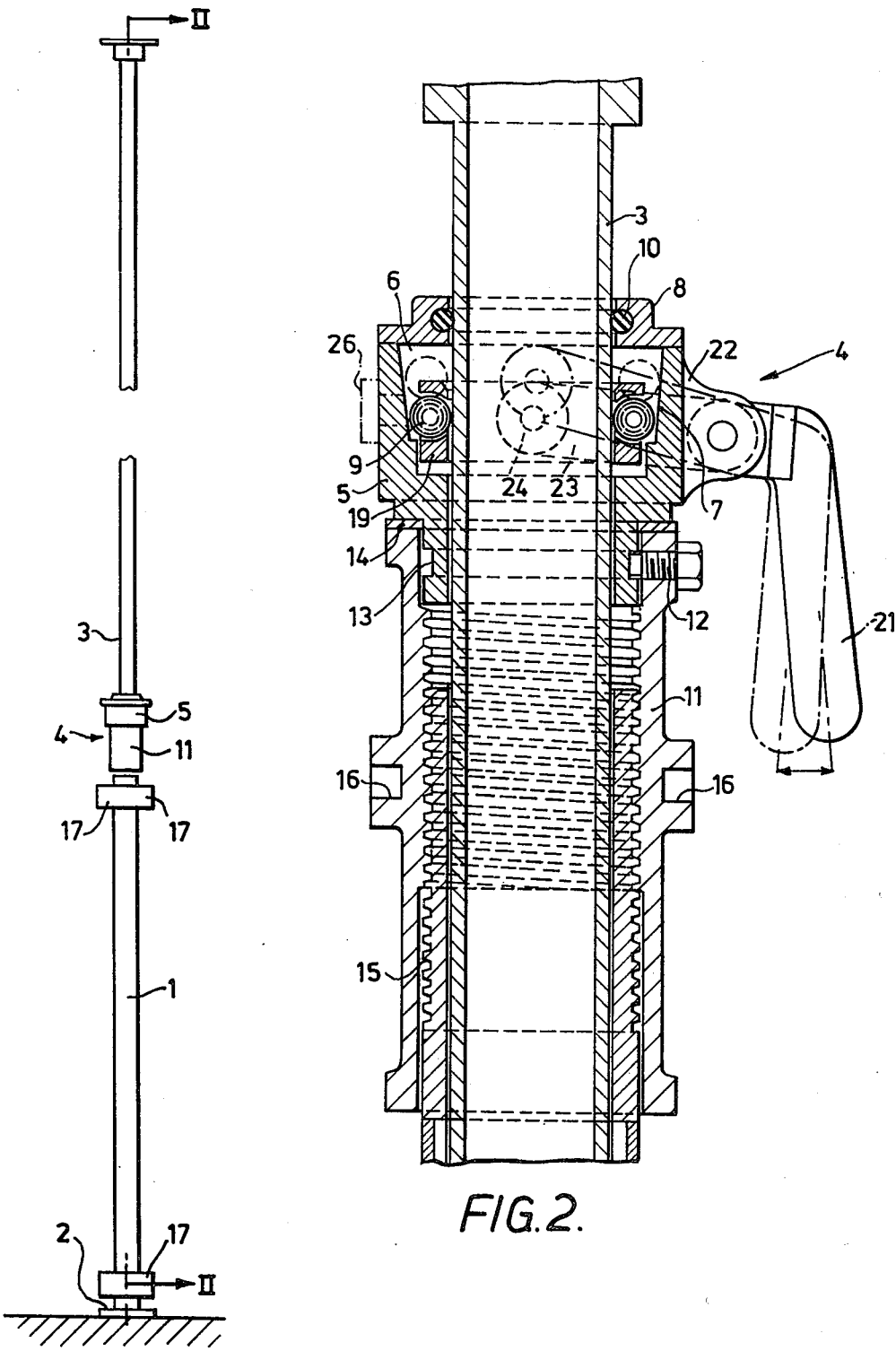

SELF-LOCKING DEVICE FOR TELESCOPIC PROPS

BACKGROUND OF THE INVENTION

This invention relates to telescopic props and self-locking devices therefor.

The invention is particularly but not exclusively applicable to telescopic props for use in building construction, of the kind used, for example, to support overhead formwork in concrete pouring and other construction works.

The use of telescopic props to support concrete formwork is well known. The most common type of telescopic prop, commonly known as the "adjustable screw prop," has an inner and outer tube both of which are provided with diametrically opposite pairs of holes at intervals. A locking pin is inserted through aligned pairs of holes in the inner and outer tubes to lock the inner tube relatively to the outer tube at an overall length which approximates as closely as possible to the desired overall length. Final adjustment of the overall length of the telescopic prop is effected by means of a screw mechanism. In practice this screw adjustment may entail changing the overall length of the prop by a considerable amount, for example up to three inches, according to the distance between centres of adjacent pairs of holes along the inner tubes. Not only is such screw adjustment difficult and time-consuming, it is also greatly hindered when the threads of the adjusting screw have become damaged or clogged with cement, or corroded, as frequently occurs in practice.

Another disadvantage of the traditional type of telescopic prop referred to above is that the entire load on the prop is taken by the locking pin inserted through the aligned holes in the inner and outer tubes; the pin in consequence can become bent, or even sheared, and the holes in which the pin is placed can become elongated, making insertion and withdrawal of the pin extremely difficult. Moreover, since the locking pin is a separate item, it is apt to become mislaid when the telescopic prop is not in use. Another disadvantage of this type of telescopic prop is that a range of different sizes of prop is usually necessary to cater for different ranges of extension of the prop.

The present invention aims to provide a self-locking device for a telescopic prop which avoids the disadvantages associated with the use of a locking pin and which is readily adjustable to different heights, being locked automatically when loaded vertically in use.

SUMMARY OF THE INVENTION

According to the present invention there is provided a self-locking device for a telescopic prop of the type comprising an extension member located within and extending from said hollow post, the locking device comprising a housing adapted to surmount said post, and to surround said extension member, means defining an annular circumferential internal channel within said housing, and a plurality of locking elements located in said channel, a frusto-conical outer surface bounding said channel in the housing, the radial width of the channel tapering in the direction in which the prop is loaded in use of the device, said locking elements being wedged in said channel in use of the device and engaging said extension member to resist movement of the latter in said direction relative to the housing by jamming of said locking elements when the extension member is loaded.

The frusto-conical bounding surface of the internal channel of the housing preferably has an angle of taper between 5° and 7½°.

The extension member used with the self-locking support of this invention preferably has a cylindrical external surface. The extension member may, for example, be a length of scaffolding pipe of standard type: since it is not necessary to provide holes in the extension member no modification of the scaffolding pipe is necessary when it is used for this purpose. Moreover, the absence of holes either in the supporting post or the extension member eliminates a possible source of structural weakness.

The channel in the housing of the self-locking support may be covered at its wider end by suitable retaining means, preferably in the form of an annular cover member, which may be removable for access to the locking elements. This cover member may in practice be slidable relative to the housing and may have an extension or attachment located within the annular channel which serves as a retaining cage for the locking elements, so that axial movement of the cover member away from the housing lifts the locking elements and releases them from jamming engagement with the extension member.

The hollow section post may have any suitable cross sectional shape, for example square or circular, affording adequate strength and rigidity.

The post is preferably provided with at least one laterally outwardly facing socket for the reception of a bracing strut, which will be substantially horizontal when the post is used in a vertical orientation as part of a support frame system of an overhead formwork or like structure.

The present invention also provides, according to another aspect, a self-locking support for a telescopic prop, comprising a hollow section post having a base end adapted to rest on a supporting surface, the internal dimensions of the post being such as to receive an extension member for sliding movement within the hollow section post, and a locking device carried at the end of the post remote from the base and said locking device comprising a housing adapted to surround the extension member, means defining within said housing an annular circumferential internal channel in which a plurality of locking balls are located, the radially outer wall of the annular channel being inclined to the longitudinal axis of the post so that the radial width of the channel tapers towards the base end of the post, whereby in use of the post the balls are wedged between the said outer wall of the annular channel and the outer surface of said extension member located within the post to prevent movement of the extension member towards the base end of said post.

The extension member may carry at its end projecting beyond the locking device a screw-adjustable extendable portion for making fine adjustments to the overall length of the prop.

For the purpose of making screw-adjustments of the overall length of the support the housing of the locking device may furthermore be provided with a screw-threaded part which is connectible to the post. This part may for example comprise an internally screw-threaded sleeve on which the housing is supported while being rotatable relative to the sleeve about its longitudinal axis, said sleeve fitting over a complementary screw-threaded member which is attachable non-rotatably to the end of the post to which the device is fitted.

Extension of the telescopic prop according to the invention to a desired overall length is effected simply by moving the extension member relative to the supporting tubular post, such sliding movement of the extension member being permitted when the load on the prop is relieved. Immediately the extension member is released and placed under load, the extension member is automatically locked to the supporting post by the jamming action of the locking elements in the housing of the locking device. It is therefore unnecessary to use the screw adjustment, where this is provided, for adjusting the overall length of the prop. In fact the screw-adjustment would normally be used for levelling purposes only and for assisting the release of the prop when it is unloaded.

BRIEF DESCRIPTION OF THE DRAWINGS

A practical embodiment of the invention will now be described, merely by way of example, with reference to the accompanying diagrammatic drawings, in which:

FIG. 1 is a diagrammatic side elevation of part of a telescopic prop provided with a self-locking device according to the invention;

FIG. 2 is a longitudinal section of the self-locking device shown in FIG. 1, taken on line II—II of FIG. 1;

The same reference numerals are used throughout the drawings to designate the same or corresponding component parts.

DESCRIPTION OF THE ILLUSTRATED EMBODIMENTS

Figure 3:
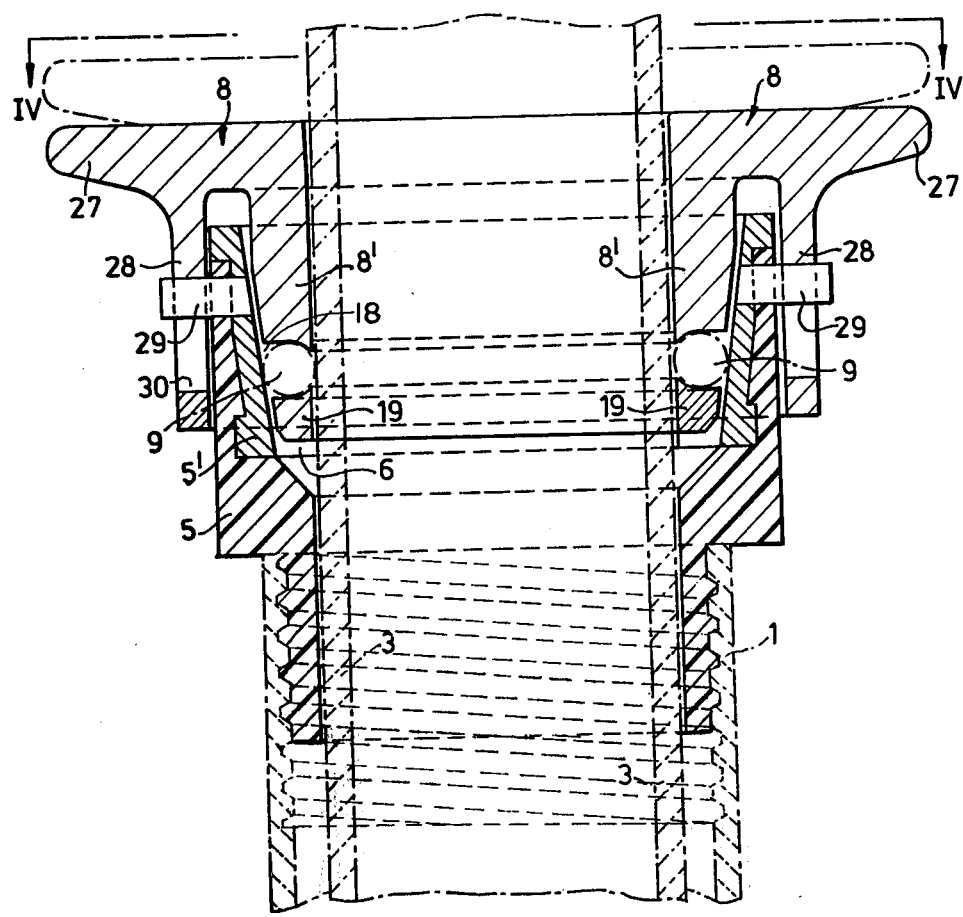
FIG. 3 is a longitudinal section of a locking device according to another embodiment of the invention, for use in a telescopic prop of the kind shown in FIG. 1.
Figure 4:
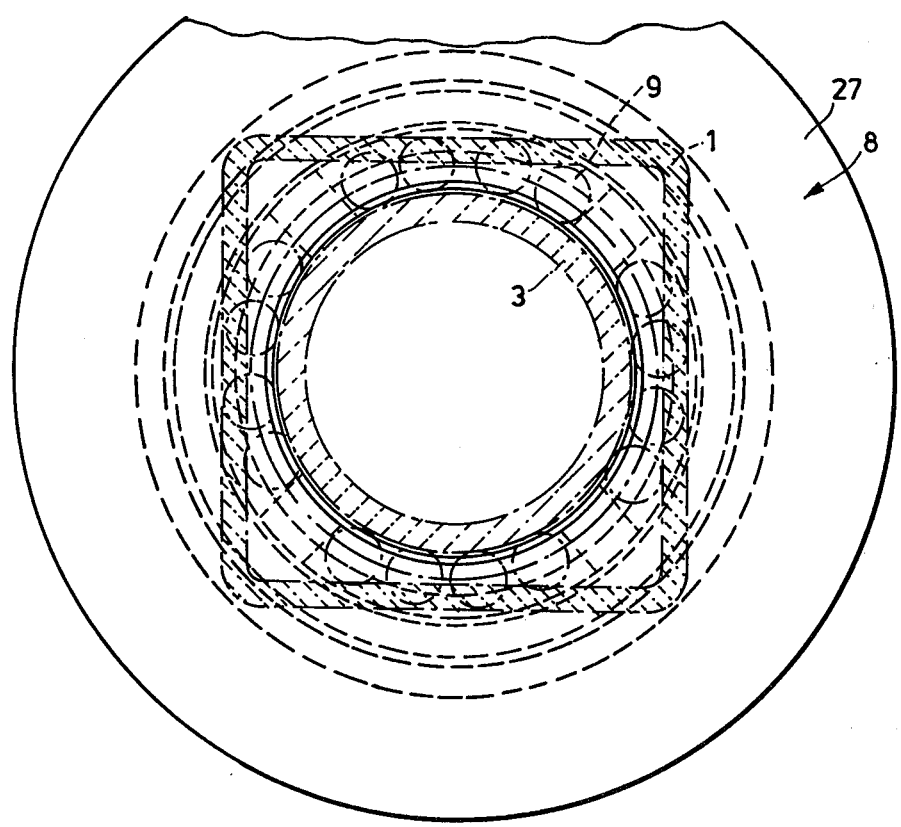
FIG. 4 is a cross-section of the self-locking device, taken on line IV—IV of FIG. 3.
Figure 5:
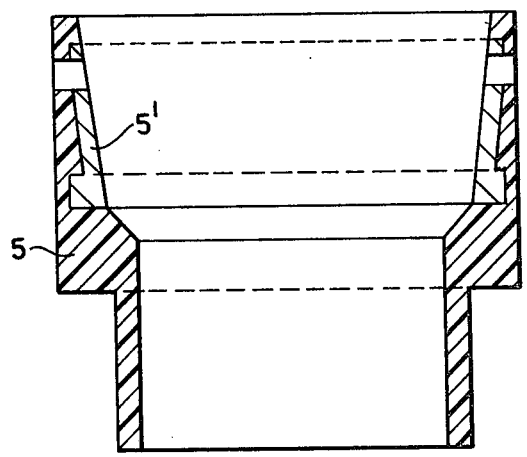
FIG. 5 is an axial section of the housing of the self-locking device.
Figure 6:
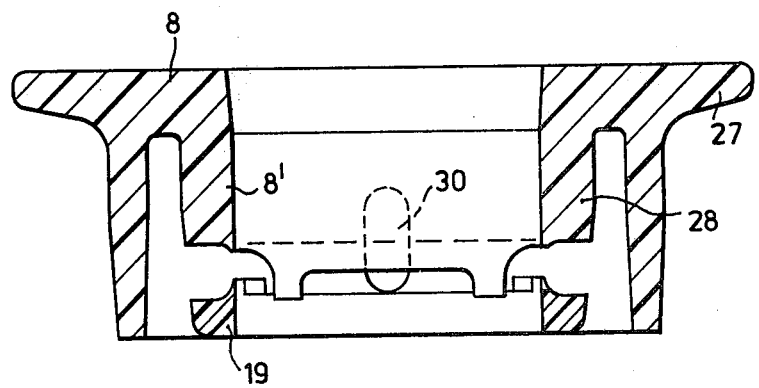
FIG. 6 is an axial section of a ball-retaining cage assembly forming part of the locking device of FIG. 3.

Referring to the drawings, a telescopic prop comprises a tubular post 1 of square cross section having a baseplate 2 welded to its bottom end. In use the baseplate 2 of the post 1 rests on a flat horizontal supporting surface with the longitudinal axis of the post 1 vertical, as shown.

The internal size of the square-cross section tubular post 1 is such as to receive an extension member comprising in this example a length of standard steel scaffold tube 3 according to British Standard 1139. The tube 3 is freely movable in an upward direction only within the tubular post 1 to any desired height. Locking of the tube 3 relative to the post 1 is effected at the desired extension of the post automatically by means of a self-locking device 4 according to the invention, which surmounts the post 1.

The locking device 4 comprises a case-hardened steel housing 5 having an annular circumferential internal channel 6 which is open at its upper end. The channel 6 is bounded by a frusto-conical outer wall 7 which tapers downwardly at a cone angle of 7½°. The wider upper end of the annular channel 6 is closed by an annular cover plate 8 which is bolted or welded to the housing 5 and which traps within the channel 6 a plurality of locking elements in the form of steel balls 9 with sheradised surfaces arranged in an annular row surrounding the circumference of the tube 3. A resilient sealing ring 10 is seated in an internal annular groove in the cover plate 8 and makes sealing contact with the surface of the tube 3. The sealing ring 10 may be of resilient elastomeric material or may, for example, comprise an annular sealing element formed by a helical coil of suitable wire.

The size of the locking balls 9 in relation to the dimensions of the annular channel 6 is such that, with the post 1 in its upright position of use, the ball 9 become wedged between the outer wall 7 of the channel 6 and the outer surface of the tube 3 as the balls 9 descend under their own weight, effectively locking the tube 3 relative to the post 1 when the tube 3 is subjected to a verticaly downward load. The jamming of the balls 9 against the tube 3 is increased as the load on the tube 3 increases so that the locking device 4 operates automatically. Upward movement of the tube 3 when the load on the tube 3 is relieved allows the locking balls 9 to rise into the wider portion of the annular channel 6 so that they cease to be in jamming engagement with the tube 3.

To permit fine adjustment of the overall length of the telescopic prop, for example for levelling purposes, the locking device 4 is fitted with a screw-adjustable portion, comprising an internally screw-threaded sleeve 11 which is freely rotatable relative to the housing 5 by virtue of the engagement of a radial stud 12 screwed into the upper end of the sleeve in a circumferential external channel 13 in the housing 5, the sleeve 11 bearing against the lower end of the housing 5 by way of an interposed annular thrust plate 14. The sleeve 11 fits over a complementarily screw-threaded member 15 which is inserted as a force-fit in the upper end of the post 1. The lower end of the sleeve 11 shrouds the screw-threaded member 15 and protects the thread of the member 15 from encrustation with foreign matter such as mud and concrete.

The sleeve 11 is provided with two or more diametrically opposed sockets 16 for the insertion of a key or wrench to facilitate the manual rotation of the sleeve 11 to adjust the height of the housing 5 on the post 1. Alternatively, fixed or hinged handles may be provided on the sleeve 11 for effecting rotation of the latter.

Screw-adjustment of the overall length of the prop may also, or alternatively be effected by means of a screw carrying a stirrup or other support engaged with a nut which is adapted to fit into the upper end of the tube 3, the nut being rotatable to adjust the length of the prop by means of, for example, a tommy bar.

In a supporting system comprising multiple supporting props, for example as used in supporting overhead formwork in concrete construction work, the props are interconnected by square or round section horizontal struts, typically 4 feet in length, engaged in laterally outwardly projecting sockets 17 provided in the supporting post 1 engaged in a cruciform or spider configuration, to provide a rigid formwork support structure. These struts ensure that the props are held accurately vertical, avoiding the loss of support strength which would result from the props being used out of plumb.

The locking balls 9 are located in individual circular apertures 18 in a retaining ring 19 which retains the balls 9 in the channel 6 in the event of removal of the tube 3. The apertures 18 taper in diameter radially inwardly.

The retaining ring 19 forms part of a release mechanism for releasing the locking balls 9 when the latter are in their jamming positions (FIG. 2). The ring 19 is displaceable upwardly by a release lever 21 pivotally mounted on external lugs 22 on the housing 5. The lever 21 has an L-shape, one arm 23 being forked and engaging diametrically opposite pins 24 attached to the release ring 19 and extending through respective axially elongated slots 25 in the housing 5.

Lubrication of the locking balls 9 can be effected by a nipple 26 in the wall of the housing 5.

In a practical embodiment of the invention of the kind shown in FIG. 2 the locking balls 9 had a diameter of 8 mm and the size of the annular channel was such that a total of 16 balls 9 were provided.

To release the telescopic prop it is simply necessary to rotate the sleeve 11 in a sense to lower it to relieve the load on the prop and then remove the prop. If it is desired to retract the tube 3, or to withdraw it, the locking balls 9 are released by pressing the lever 21 towards the tube to the position shown in broken outline in FIG. 2.

An important safety feature is that release of the locking balls 9 can be effected, by depressing the lever 21 as viewed in FIG. 2, only when the telescopic prop is not under load; when the prop is bearing a load the jamming action forces the balls 9 downwardly with a greater force than is applicable manually by means of the lever 21. Also, the release of the locking balls 9 to allow lowering of the tube 3 can be effected gradually to regulate the speed of lowering by suitably controlling the depression of the lever 21.

FIGS. 3 to 6 illustrate another embodiment of the invention in which the ball housing 5 is made of molded plastics or metal or otherwise fabricated, with a hardened steel insert 5' against which the locking balls 9 bear. This version has the advantage of lightness and economy of manufacture.

The cover plate 8, which may also be made of molded plastics or metal or otherwise fabricated, has an integral tubular extension 8' which extends into the annular channel 6 and which forms part of a ball retaining cage. An annular retaining member 19 of plastics or metal is releasably secured, for example by screws or snap-engaging fastenings, to the lower end of the extension 8' to trap the locking balls 9.

The cover plate 8 is formed with an integral outwardly projecting annular flange 27 by means of which the cover plate 8 and the extension 8' may be lifted when the prop is not under load, to release the locking balls 9. The cover plate 8 is also formed with an integral depending shroud 28 which fits over the outer surface of the housing 5 to protect the channel 6 from the ingress of dirt and water. A sealing ring (not shown) similar to the sealing ring 10 illustrated in FIG. 2 may be housing in the tubular extension 8' of the cover plate for this purpose.

FIG. 3 illustrates, as an optional feature, means for limiting the upward movement of the cover plate 8 when releasing the balls, in the form of outwardly projecting pins 29 attached to the housing 5 which move in axially elongate slots 30 in the tubular shroud 28. Other means of limiting the upward movement of the plate 8 may, of course, be provided.

In a typical practical embodiment of the invention the overall height of the telescopic prop when fully collapsed is about 6 feet and its maximum height when extended is 10 feet 6 inches. The maximum extension can, however, be increased by providing a longer supporting post 1 and/or by using longer extension tubes, possibly themselves fitted with locking devices 4 as herein described in place of the tube 3 of the embodiment herein described.

The telescopic prop according to the invention is of simple construction and is very easy to use; moreover the effectiveness of the prop is not impaired by exposure of the prop to the elements. For example, if the outer surface of the inner tube 3 becomes corroded or roughened, this simply enhances the frictional grip between the locking balls 9 and the tube. Encrustation of the exposed portions of the tube 3 is prevented from interfering with the operation of the locking device 4 by virtue of the annular cover plate 8, which scrapes off any such encrustations on the inner tube 3 as the latter is lowered into the tubular post 1.

The embodiment of FIGS. 3 to 6 would in practice be provided with screw adjustment means for fine adjustment of the overall length of the prop, as shown schematically similar to that provided in the embodiment of FIGS. 1 and 2, such screw adjustment means being provided on the housing 5 and/or on the extension tube 3, as previously described.

In the illustrated embodiments of the invention the prop is shown in a vertical position of use. It will be appreciated, however, that the telescopic prop according to the invention can also be used in a horizontal orientation as a strut or brace adjustable to any desired length.

I claim:

1. A self-locking support for a telescopic prop, comprising an extension member, a hollow section post having a base end adapted to rest on a supporting surface, the internal dimensions of the post being such as to receive the extension member for sliding movement within the hollow section post, and a locking device carried at the end of the post remote from the base, said locking device comprising a housing adapted to surround the extension member; means defining within said housing an annular circumferential internal channel, the radially outer wall of the annular channel being inclined to the longitudinal axis of the post so that the radial width of the channel tapers towards the base end of the post; a plurality of locking balls located in said channel such that in use of the post the balls are wedged between the said outer wall of the annular channel and the outer surface of said extension member located within the post to prevent movement of the extension member towards the base end of said post; cover means attached to said housing and slidable relative thereto, said cover means having an extension located within the annular channel wherein axial movement of said extension out of said chennel effectuates a release of said locking balls from said extension; and attaching means to attach the housing to an end of the hollow post remote from the base such that said housing is longitudinally adjustable with respect to the hollow post.

2. A telescopic prop comprising a hollow section post having a base end adapted to rest on a supporting surface; an extension member located within the post; and a locking device carried at the end of the post remote from the base end, said locking device comprising a housing adapted to surround the extension member; means defining within said housing an annular circumferential internal channel, the radially outer wall of the annular channel being inclined to the longitudinal axis of the post so that the radial width of the channel tapers towards the base end of the post; a plurality of locking balls located in said channel such that in use of the post the balls are wedged between the said outer wall of the annular channel and the outer surface of said extension member located within the post to prevent movement of the extension member towards the base end of said post; cover means attached to said housing and slidable relative thereto, said cover means having an extension located within the annular channel wherein axial movement of said extension out of said channel effectuates a release of said locking balls from said extension; and attaching means to attach the housing to an end of the hollow post remote from the base such that said housing is longitudinally adjustable with respect to the hollow post.

3. The telescopic prop defined in claim 2, wherein the extension member carries at its end projecting beyond the locking device a screw-adjustable extendable portion for adjusting the overall length of the prop.

4. A self-locking device for a telescopic prop having a hollow post with a base and an extension member located within and extending from the hollow post, said device comprising:
   a. a housing surrounding said extension member;
   b. means defining an annular circumferential internal channel within said housing, the outer bounding surface of said channel having a frusto-conical shape, the radial width of said channel tapering in the direction in which the prop is loaded;
   c. a plurality of locking elements located in said channel and surrounding the extension member such that said locking elements are wedged between the channel outer bounding surface and the extension member to prevent relative motion between the housing and the extension member in the direction in which the prop is loaded;
   d. a cover member attached to said housing and being slidable relative to the housing, said cover having an extension located within the annular channel engaging the locking elements such that axial movement of the extension out of said channel moves the locking elements to release them from jamming engagement with the extension member; and,
   e. attaching means to attach the housing to an end of the hollow post remote from the base such that said housing is longitudinally adjustable with respect to the hollow post.

5. A support device according to claim 4, wherein said cover member is attached to the housing at the wider end of the annular channel so as to make sealing contact with a said extension member when inserted in the post in use of the support device.

6. The device defined in claim 4, wherein the locking elements comprise spherical balls.

7. The device defined in claim 4, wherein the housing comprises a molding having a metal insert defining said frusto-conical outer surface of the annular channel.

8. The device defined in claim 4 wherein the attaching means comprises a screw-threaded sleeve which is threadingly connectable to said post and rotatably connected to said housing such that the housing is longitudinally adjustable relative to the said hollow post to permit adjustment of the position of the channel in use of the device.

9. The device defined in claim 8, wherein the screw-threaded sleeve is internally threaded, said sleeve fitting over a complementary screw-threaded member which is non-rotatably attached to the end of the post to which the device is fitted.

10. The device defined in claim 4, wherein the cover member is provided with a depending shroud which fits over the outer surface of the housing.

11. The device defined in claim 4, wherein the cover member is formed with an outwardly projecting radial flange by means of which the extension may be moved in an axial direction to release the locking elements.

* * * * *